United States Patent [19]

Hasha

[11] 4,152,926
[45] May 8, 1979

[54] METHOD AND APPARATUS FOR TESTING THE CONNECTIONS BETWEEN PIPE SEGMENTS

[76] Inventor: Malvern M. Hasha, 1527 Castlerock, Houston, Tex. 77090

[21] Appl. No.: 849,309

[22] Filed: Nov. 7, 1977

[51] Int. Cl.² .............................................. G01M 3/28
[52] U.S. Cl. ........................................ 73/46; 73/49.1; 277/188 A
[58] Field of Search ..................... 73/46, 40.5 R, 49.1, 73/49.5, 49.8; 138/89, 90; 277/79, 188 A, 164, 206

[56] References Cited

U.S. PATENT DOCUMENTS

| | | | |
|---|---|---|---|
| 2,732,268 | 1/1956 | Duval | 277/79 X |
| 2,761,311 | 9/1956 | Baker | 73/46 |
| 3,371,521 | 3/1968 | Hauk | 73/46 |
| 3,897,071 | 7/1975 | LeRouax | 277/188 A X |
| 3,921,437 | 11/1975 | Hauk | 73/46 X |

Primary Examiner—John Petrakes

[57] ABSTRACT

A method and apparatus of testing the connections between the pipe segments comprising a string of pipe being snubbed into a well under pressure immediately before such connections are forced into the pressurized well. There is provided gripping means which is vertically movable with respect to the well to grip the additional segments of pipe to be added to the string. Force means are secured to the gripping means to provide the force necessary to force the gripping means downwardly and thereby force the string of pipe with the additional segment connected therein further into the pressurized well. A testing apparatus is secured to the gripping means for externally testing the connection between the pipe string and the additional segment of pipe connected thereto. If the connection has no leak therein, the external testing means is released and the gripping means is extended upwardly to grip the string of pipe at its upper end thereof and the string of pipe is driven further into the pressurized well. If the connection has a leak therein, the external testing means is released and the additional segment of pipe is disconnected, the threads are inspected, and either a new connection made up with the same additional segment of pipe or between the string of pipe and a new additional segment of pipe.

8 Claims, 2 Drawing Figures

METHOD AND APPARATUS FOR TESTING THE CONNECTIONS BETWEEN PIPE SEGMENTS

CROSS-REFERENCE TO RELATED APPLICATIONS

This is a related application to the prior co-pending application Ser. No. 506,547 filed Sept. 16, 1974 for "Leak Testing Method And Apparatus For Tubular Members And Packer Means Therefor," which application was a continuation-in-part of application Ser. No. 467,133 filed May 6, 1974, now abandoned, for "Leak Testing Method And Apparatus For Tubular Members and Packer Means Therefore." This is also a related application to the prior application Ser. No. 632,790 filed Nov. 7, 1975 for "Annular Seal" which issued Mar. 8, 1977 as U.S. Pat. No. 4,010,633.

BACKGROUND AND OBJECTS OF THE INVENTION

There exists in the oil and gas industry a procedure known as "snubbing" in which a string of pipe is forced into a wellhole under pressure for various reasons, such as, to remove an obstruction that might exist in the well. In such cases, the wellhole usually has been drilled and a certain amount of casing has been set and blowout preventors or other ram apparatus have been installed at the wellhead to seal around the drill pipe or other pipe strings being inserted into the wellhole. These blowout preventers and ram-type apparatus seal around the string of pipe being snubbed into the well under pressure to prevent the pressurized fluid from escaping around the outside of the string of pipe. In practice, the body of the individual segments of pipe comprising the string of pipe to be snubbed into the well usually are rack-tested hydrostatically or otherwise prior to use to make certain there are no leaks in the body of the pipe. However, as the connections between the various pipe segments are made-up and snubbed into the well, they are usually immediately subjected to high external pressures. The rack testing of the pipe segments will not reveal a leak that exists in a connection between two of the pipe segments. A leak in a connection creates a very hazardous working condition for all personnel involved as high-pressure fluid may flow from the inside of the wellhole, through the leak, upwardly through the string of pipe being snubbed into the well, and out onto the workmen. In addition, if corrective measures are required to correct the leak in a connection between the pipe segments after the string of pipe has been snubbed into the well, such corrective measures are expensive.

There also exists in the oil and gas industry a procedure known as the work-over of a well in which a string of pipe is forced into a previously drilled well. The well is "live," that is, contains fluid under pressure, below a certain depth but because of some obstruction, such as sand or concrete or the like, contains little or no pressurized fluid above that depth. When the tool on the end of the string of pipe breaks through the obstruction, the entire drill string, including the connections between the segments, is subject to the pressures of the well, which pressures can be intense. The same problems described above with respect to snubbing pipe into a completely live well, are applicable to this workover procedure. It is intended that the improved method and appartus shall be applicable to such a workover procedure and, as such, as used herein the word snubbing shall include not only inserting a string of pipe into a completely live well but also inserting a string of pipe into a well under circumstances in which the possibility exists that the string of pipe may be subjected to pressurized fluids.

It is an object of this invention to provide a method and apparatus for testing the connections between the pipe segments comprising a string of pipe being snubbed into a well under pressure immediately before such connections are forced into the pressurized well and thereby reducing hazardous working conditions by testing the connections for leaks after making them up and just prior to snubbing them in.

It is an additional object of this invention to provide an improved method and apparatus for snubbing a string of pipe into a well under pressure within a testing apparatus for externally testing the connections between the segments of pipe comprising the string of pipe is mounted for vertical movement above the blowout preventers or other ram-safety apparatus so that the connections between the pipe segments comprising the string of pipe may be tested immediately before such connections are forced into the pressurized well.

The invention itself, as well as additional objects and advantages thereof, will become readily apparant from the following description in connection with the accompanying drawings, in which like numerals represent like parts:

DESCRIPTION OF THE PREFERRED EMBODIMENT

Figure 1:
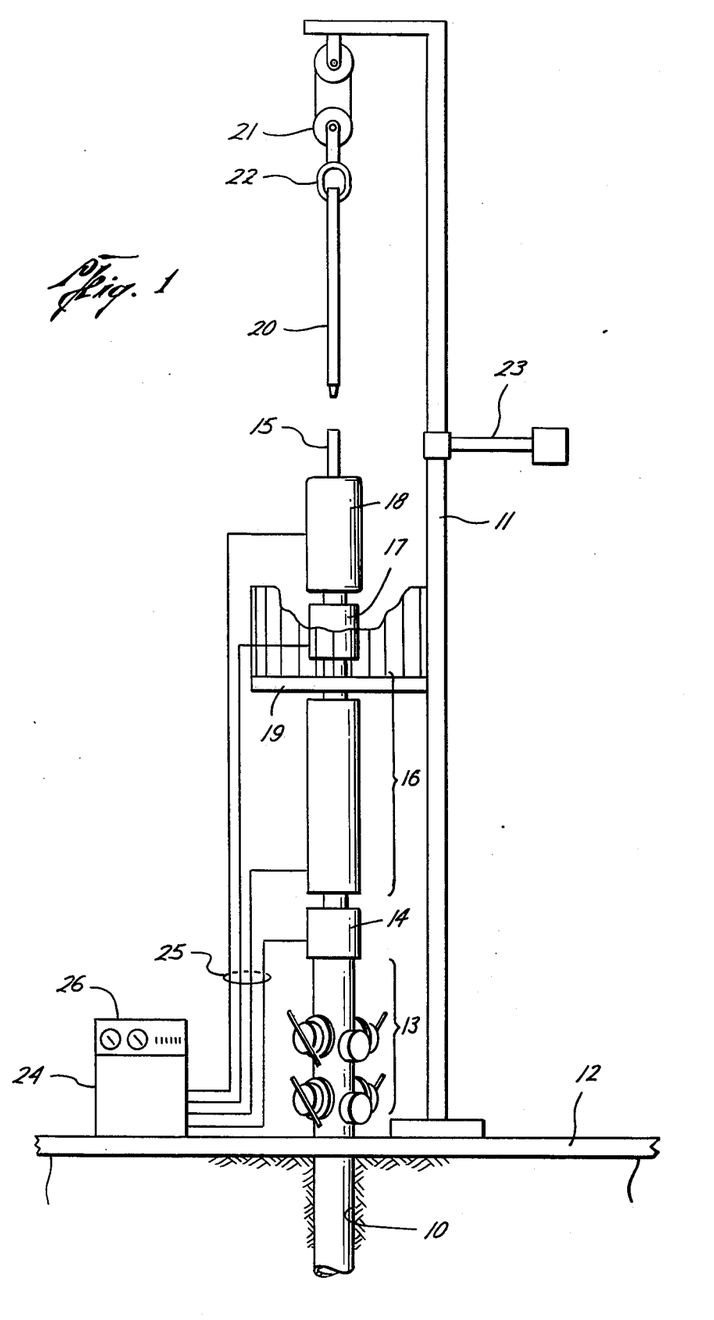
FIG. 1 is a side view of a mast rising above the blowout preventers and other ram-safety apparatus secured to the top of a wellhole and showing generally the apparatus according to this invention utilized to snub a string of pipe into the pressurized well and test the connections between the pipe segments comprising the string of pipe immediately before such connections are forced into the pressurized well.

FIG. 1 illustrates a wellhole 10 dug in the earth with a mast 11 erected on a floor 12 and rising above the wellhole 10. Above the wellhole 10 are secured blowout preventers and other ram-devices 13, such as stripping rams, safety rams, blind rams and cutter rams. Secured to the well above the ram apparatus 13 is a first gripping means 14 or stationary snubber. The first gripping means or stationary snubber 14 functions to grip the string of pipe 15 being inserted into the pressurized well to prevent the pipe from undesirable vertical movement either downwardly into the wellhole or upwardly and outwardly responsive to the pressure of the well. The first gripping means 14 may be any of numerous commercially available apparatus well known to those skilled in the art.

Mounted above and secured to the first gripping means 14 is a means 16 for imparting vertical force to a second gripping means and a testing means which will be hereinafter described. The means 16 for imparting vertical force preferably is a hydraulic piston and cylinder assembly as will be hereinafter explained.

Mounted to the means 16 for providing vertical force is a second gripping means 17 or traveling snubber. The second gripping means or traveling snubber 17 moves vertically with respect to the well and releasably grips selected of the upper segments of the string of pipe being snubbed into the well.

Secured to the traveling snubber 17 is a testing means 18 for externally testing the connections between the segments of pipe comprising the string of pipe being snubbed into the pressurized well.

A work basket 19 is secured to the force means 16 preferably at a height where it will be in the vicinity of the traveling snubber 17 and the test apparatus 18 when such apparatus are at their lowest positions. The work basket is positioned such that a workman standing therein can be adjacent the upper end of the pipe string 15 held by the first gripping means 14 and can work with the connection to be formed between the additional segment of pipe, denominated as 20 in FIG. 1, to be connected into the pipe string. FIG. 1 depicts the additional segment 20 of pipe being placed in position by a traveling block 21 secured to the mast 11 in the usual fashion and a power swivel 22 which generates the rotary forces to make-up the connection. A power tong apparatus 23 is shown to be pivotally mounted to the mast 11 whereby it can be pivoted into position, if desired, to make and break the connection between the string of pipe 15 and the additional segment of pipe 20.

A pump apparatus 24 is mounted on the rig floor 12 and hydraulic fluid is supplied from the pump to the first gripping means 14, the force means 16, the traveling gripping means 17, and the testing means 18, through flexible hoses 25. A control panel 26 preferably is mounted near the rig floor 12 in association with the pumps 24 for controlling the operation of the first gripping means 14, the force means 16, the traveling gripping means 17, and the testing means 18.

Figure 2:
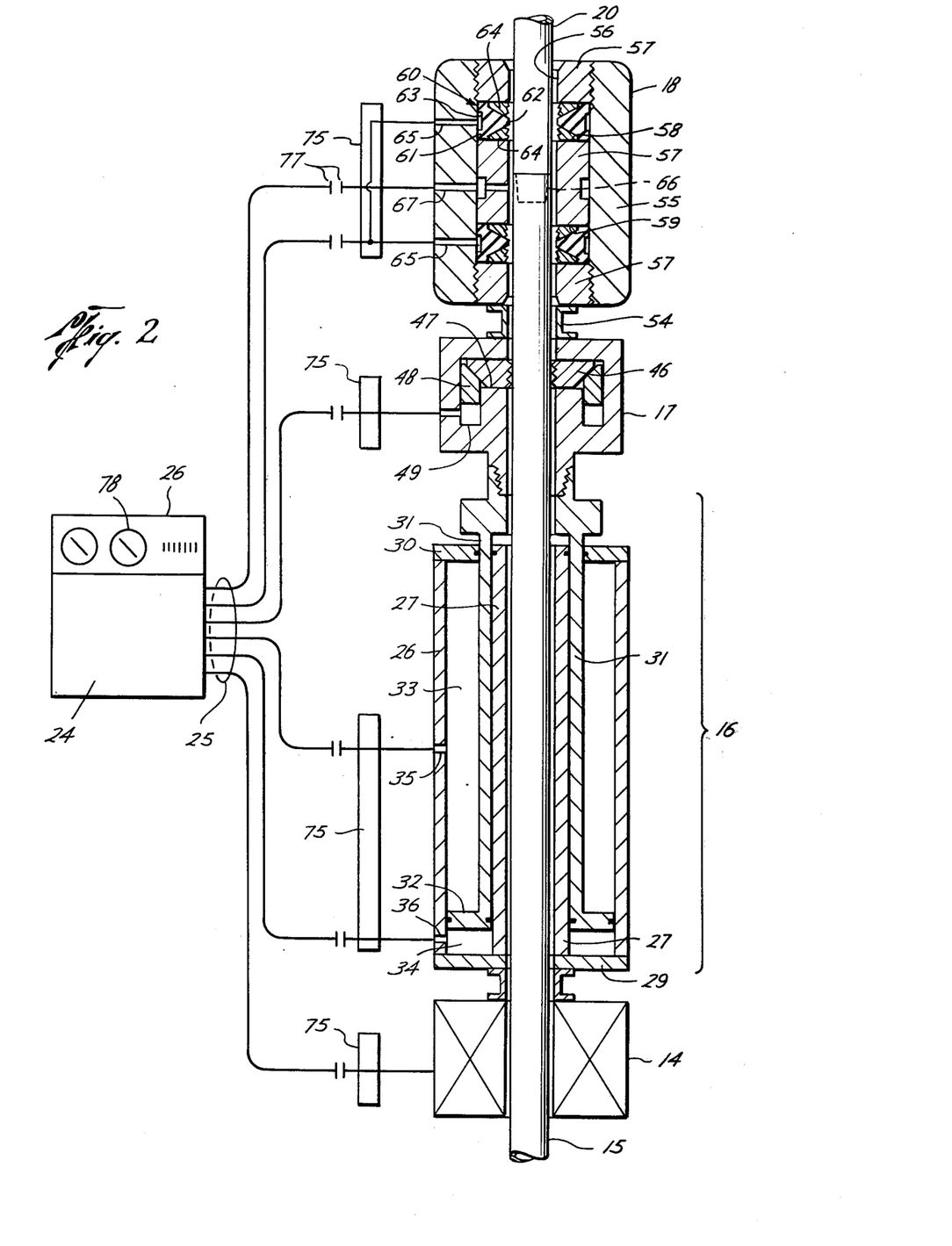
FIG. 2 is an enlarged side view, partially in schematic and partially in section, of the traveling gripping means and the the external testing apparatus mounted thereto and showing the control panel mounted on the rig floor for operation by the personnel.

FIG. 2 shows in more detail the preferred hydraulic piston and cylinder assembly comprising the vertical force means 16, the preferred details of the traveling snubber 17 and the testing means 18 and the means for operating such apparatus. The hydraulic piston and cylinder assembly preferably comprises an outer cylinder 26 which has secured thereto an inner cylinder 27. The inner cylinder 27 is secured to the outer cylinder 26 at the lower portion thereof through an annular plate 29. Another annular plate 30 is secured to the upper end of the outer cylinder 26. Mounted for longitudinal movement within the cylinder assembly is an annular piston rod 31 having an annular piston 31 mounted at its lower end. Preferably the annular piston rod 31 slides against the inner cylinder 27 and is sealed against the inner cylinder 27 and the upper annular plate 30. The annular piston 32 preferably is slidingly sealed against the inner cylinder 27 and the outer cylinder 26. There is an annular chamber 33 formed between the annular piston rod 31, the outer cylinder 26, the annular piston 32 and the upper annular plate 30. There is another annular chamber 34 formed between the outer cylinder 26, the inner cylinder 27, the lower annular plate 29 and the annular piston 32. Hydraulic fluid is forced into and removed from these two annular chambers 33 and 34 through ports 35 and 36, respectively, to drive the annular piston 32 in a selected direction and thereby impart vertical force to the annular piston rod 31.

Secured to the upper end of the annular piston rod 31 in some manner well known to those skilled in the art, such as by threads or otherwise, is the traveling snubber 17. The traveling snubber 17 may be any of numerous commercially available gripping apparatus well known to those skilled in the art. FIG. 2 illustrates a type of snubbing means 17 which includes a plurality of gripping elements 46 having teeth thereon to grip the pipe segments. Each gripping means 46 is movable in grooves 47. A cam element 48 (only one of which is shown) interacts through inclined surfaces with the backside of each of the gripping elements 46. Hydraulic fluid forced into a chamber 49 associated with each cam element moves the cam members 48 upwardly and causes the gripping elements 46 to grip the pipe segment.

Secured above the traveling snubber 16 through flanges 54 or other means, is the testing means 18. The testing means 18 preferably is an external testing apparatus comprising a body 55 having a longitudinal opening 56 extending therethrough through which may be passed the connected pipe segments comprising the pipe string 15. Related application Ser. No. 506,547 filed Sept. 16, 1974 for "Leak Testing Method and Apparatus for Tubular Members and Packer Means Therefor" discloses a method and structural arrangement for an external tester which may be maintained in a position about a tubular member for the testing of a certain portion of the tubular member, such as the connections therein, for defects by use of fluid under pressure. Application Ser. No. 506,547 is expressly incorporated herein by reference. The method and structural arrangement of the external tester disclosed in such application Ser. No. 506,547 includes one or more annular seal means spaced longitudinally within the body opening and mounted in the body so that when fluid under a selected pressure is supplied through passage means in the body, the annular seals are urged into sealing engagement with the tubular member. U.S. Pat. No. 4,010,633, which is expressly incorporated herein by reference, discloses an improved annular seal including an annular elastomer body having inner and outer surfaces and interlocking reinforcing means associated with the inner surface of the elastomer body.

Referring to FIG. 2, the preferred structural arrangement of the testing means of the form disclosed in said application Ser. No. 506,547 and the improved annular seal means disclosed in said U.S. Pat. No. 4,010,633, shall be generally described herein. The body 55 of the testing apparatus 18 preferably includes spacer means 57 which are annular members having longitudinal openings therethrough and which form part of the body 55 and provide the longitudinally extending opening 56 through the body. The spacer means can be of varying thicknesses and by changing the thicknesses of the spacer means, the ability of the testing apparatus to receive strings of pipes of varying diameters can be altered. The spacer means are positioned so as to form first and second annular grooves 58 and 59 in the body of the testing apparatus spaced longitudinally along the opening. An annular seal means 60 (only a portion of one such annular seal means is shown) is mounted in each groove for inwardly and outwardly radial movement. Each of the annular seal means 60 preferably comprises an annular elastomer body 61 having an inner surface 62 extending generally towards the pipe string to be sealingly engaged and having an outer circumferential surface 63 for receiving fluid pressure. The inner surface 62 preferably includes two opposing sloping surfaces which taper inwardly to a surface which physically engages the pipe string when the annular seal means is moved radially inwardly. Preferably back-up means 64 of the type disclosed in U.S. Pat. No.

4,010,633 are mounted in association with each annular seal means for inward and outward radial movement with such seal means. The back-up means preferably comprise a plurality of anti-extrusion elements mounted on the upper inner portion and the lower inner portion of the annular seal means so as to be simultaneously movable therewith in a radial direction so to form a substantially circular ring on the upper inner portion and the lower inner portion of the annular seal means when the annular seal means and the back-up means engage the pipe. Each of the plurality of anti-extrusion elements forming the back-up means preferably has a first surface extending toward the tubular member to be sealingly engaged and a sloping surface for engaging the sloping surface of the annular seal means which tapers inwardly towards the pipe.

When actuating fluid under pressure is supplied through ports 65 into the spaced first and second annular grooves and against the outer circumferential surface 63 of each of the annular seal means, the annular seal means and the associated back-up means are forced radially inwardly to sealingly engage the pipe at selected positions. If the pipe string 15 and the testing apparatus 18 have been positioned such that the connection between the segments of the pipe string, which connection is denominated 66 in FIG. 2, is between the annular seal means 60, when the annular seal means and its associated back-up means sealingly engage the pipe there is formed a closed chamber which seals off the exterior of the connection means. A pressurized test fluid may then be supplied through port 67 into the closed chamber to externally test the connection 66. Preferably the external tests are performed by measuring any decline of the pressure in the testing fluid occurring in the closed chamber, which decline is indicative of a leak in the tubular member.

The first gripping means or stationary snubber 14 may

In the preferred method and apparatus of testing the connections between the pipe segments comprising the string of pipe being snubbed into a well under pressure according to this invention, the control panel 26 for operating the testing apparatus 18, the traveling snubber 17, the hydraulic piston and cylinder assembly 16, and the stationary snubber 14, is located near the rig floor. Preferably a manifold 75 is secured to the testing apparatus 18 and the manifold is connected to the flexible hoses 25 through quick disconnect means 77. Likewise, manifolds 75 are secured to the traveling snubber 17 and to the hydraulic piston and cylinder assembly 16 and are connected through quick disconnect means 77 to additional of the flexible hoses 25.

Mounted on the floor of the rig is an air supply and a water supply which provide air and water to a pump accumulator unit, all of which is referred to herein as the pump means 24.

In operation, assuming that the string of pipe 15 is already partially snubbed into the pressurized well, the string of pipe 15 is gripped by the first gripping means 14 attached to the well head above the ram devices. The hydraulic piston and cylinder assemblies 16 and the traveling snubber 17 and the testing apparatus 18 mounted thereabove are lowered to a selected position wherein the upper end of the string of pipe 15 preferably extends above the testing apparatus 18 as shown in FIG. 1. An additional segment of pipe 20 is placed in position above the uppermost segment of the pipe string 15. Such additional segment of pipe 20 is connected to the uppermost segment of the pipe string 20 by means of the power swivel 22 or the power tongs 23.

Once the additional segment of pipe 20 has been connected to the string of pipe 15, the hydraulic piston and cylinder assembly 16 is activated whereby the traveling snubber 17 and the testing apparatus 18 are moved vertically upwardly to the point that the connection, denominated as 66 in FIG. 2, is positioned within the testing apparatus 18 between the two annular seal means 60 therein.

Valving in the control panel 26 is operated to supply hydraulic fluid against the annular seal means 60 mounted in the two grooves 58 of the body 55 of the testing means 18 whereby the annular elastomer seal means 60 sealingly engage the pipe string 15 on either side of the connection 66 and the body 55 and the annular seal means 60 form a closed chamber surrounding the exterior of the connection 66. Valving in the control panel 26 is operated to supply pressurized hydraulic test fluid into the closed chamber to externally test the connection. In view of the importance of the test in such an operation, the connections preferably are tested under pressures up to the collapse rating of the pipe. Any decline in the pressure of the testing fluid occurring in the closed chamber is measured, such as by gauge 78 in the control panel 26, which decline is indicative of a leak in the connection.

Depending upon whether there is or is not a decline in the pressure of the testing fluid in the closed chamber, preferably one or the other of the following series of steps is performed.

If there is no decline in the pressure of the testing fluid in the closed chamber, the pressure of the test fluid in the closed chamber is released by the operation of appropriate valving in the control panel 26 and the pressure of the actuating fluid supplied against the annular seal means 60 is released by the operation of appropriate valving. The hydraulic piston and cylinder assembly 16 is operated whereby the second gripping means 17 or traveling snubber and the testing apparatus 18 mounted thereabove are moved to the upper end of the additional pipe segment 20 which has now been connected to the string of pipe 15. Once the traveling snubber 17 has been extended upwardly to its selected position, valving is operated whereby the traveling snubber 17 grips the new segment of pipe 20 at a selected position in the vicinity of its upper end. The first gripping means 14 is then released and the hydraulic piston and cylinder assembly 16 is operated whereby the traveling snubber 17 connected to the piston rod 3; is moved downwardly and the string of pipe gripped by the traveling snubber 17 is forced further into the well under pressure. Since the connection 66 between the additional segment of pipe 20 and the string of pipe 15 has been tested immediately before it is inserted into the pressurized well, there is little or no chance there will be any leak in the connection resulting from such connection immediately being subjected to high pressures inside the well.

If there is a decline in the pressure of the testing fluid indicating a leak in the connection 66, the pressure of the test fluid supplied into the closed chamber is released and the pressure of the actuating fluid supplied against the annular seal means 60 is released. The hydraulic piston and cylinder assembly 16 is operated whereby the traveling snubber 17 and the testing apparatus 18 preferably are moved vertically downwardly to a selected point whereby the connection 66 between the new segment of pipe 20 and the string of pipe 15 is exposed. The additional segment of pipe 20 is then disconnected from the pipe string 15 by the use of the power swivel 22 or by the use of power tongs 23. The threads are then inspected and a new connection is then made up between the pipe string 15 and the same additional segment 20 of pipe or a new segment of pipe brought into position above the pipe string 15. Once the new connection is made up between the pipe string and the segment of pipe, the hydraulic piston and cylinder assembly 16 and the testing apparatus 17 are again operated to test the connection.

The above described steps are repeated repetitively until the selected length of pipe string has been snubbed into the pressurized well with the connections between the various pipe segments thereof being tested immediately before being snubbed into the well.

Thus, this invention provides an improved method and apparatus for forcing a string of pipe into a well under pressure wherein the connections between the pipe segments comprising the string of pipe are tested immediately before such connections are forced into the pressurized well. Many variations in the form of the preferred embodiment of the improved method and apparatus will now be apparent to those skilled in the art. For example, the control panel and the appropriate valving may be located on the floor of the derrick adjacent the accumulator unit and the hydraulic pump, rather than such apparatus being located in the work basket. Moreover, the valving and the control gages could be physically attached to the test apparatus and movable therewith. In addition, numerous types of devices well known to those skilled in the art can be utilized as a gripping means and the means for effecting movement of the gripping means. Therefore, the invention should not be limited to the preferred embodiment, but rather should extend to the full scope and spirit of the invention described and claimed in the appended claims.

What is claimed is:

1. The method of testing the connections between the pipe segments comprising a string of pipe being snubbed into a well under pressure immediately before such connections are forced into the pressurized well, including the steps of:
   1. gripping with first gripping means attached to the well the string of the pipe being forced into the pressurized well;
   2. placing an additional segment of pipe in position above the uppermost segment of the pipe string and connecting such additional segment of pipe to the uppermost segment of the pipe string;
   3. moving vertically second gripping means and a testing apparatus for externally testing the connection between the additional segment of pipe and the pipe string;
   4. operating the testing apparatus to test externally the connection between the additional segment of pipe and the pipe string;
   5. depending upon whether the external test evidences the connection does or does not leak, performing one or the other of the following sets of steps:
      (a) if there is no leak in the connection performing the steps comprising:
         (1) releasing the testing apparatus from the connection;
         (3) moving upwardly the second gripping means to the vicinity of the upper end of the additional pipe segment,
         (3) gripping the additional pipe segment in the vicinity of its upper end with the second gripping means,
         (4) releasing the first gripping means, and
         (5) moving downwardly the second gripping means thereby forcing the string of pipe further into the pressurized well;
      (b) if there is a leak in the connection, performing the steps comprising:
         (1) releasing the testing apparatus from the connection,
         (2) disconnecting the additional segment of pipe from the pipe string;
         (3) making up a new connection between the pipe string and a segment of pipe, and
         (4) repeating steps 3 and 5; and
   6. repetitively repeating steps 1 through 5 until a selected length of pipe string has been snubbed into the pressurized well with the connections between the various pipe segments thereof being tested immediately before being snubbed into the well.

2. The method of testing the connections between the pipe segments comprising a string of pipe being snubbed into a well under pressure immediately before such connections are forced into the pressurized well, including the steps of:
   1. gripping with the first gripping means attached to the well the string of the pipe being forced into the pressurized well;
   2. placing an additional segment of pipe in position above the uppermost segment of the pipe string and connecting such additional segment of pipe to the uppermost segment of the pipe string;
   3. moving vertically second gripping means and a testing apparatus comprising a body having a longitudinal opening therethrough and which is mounted vertically adjacent to the second gripping means to a point where the connection between the additional pipe segment and the pipe string is within the longitudinal opening of the testing apparatus, said testing apparatus including:
      first and second annular grooves therein spaced longitudinally along the opening;
      annular seal means mounted in each groove for inwardly and outwardly radial movement, each of the annular seal means comprising an annular elastomer body having an inner surface extending generally towards the pipe string to be sealingly engaged and having an outer circumferential surface for receiving fluid pressure, the inner surface including two opposing sloping surfaces which taper inwardly to a surface which physically engages the pipe when the annular seal means is moved radially inwardly;
      back-up means mounted in association with each annular seal means for inward and outward radial movement with such seal means, the back-up means for each annular seal means comprising a plurality of anti-extrusion elements mounted on the upper inner portion and the lower inner portion of the annular seal means so as to be simultaneously movable therewith in a radial direction and so as to form a substantially circular ring on the upper inner portion and the lower inner portion of the annular seal means when the annular seal means and the back-up means engage the pipe;

each of the plurality of anti-extrusion elements forming the back-up means having a first surface extending toward the tubular member to be sealingly engaged and having a sloping surface for engaging the sloping surface of the annular seal means which tapers inwardly toward the pipe;

4. supplying actuating fluid under pressure directly against the other circumferential surface of each of the annular seal means to force the annular seal means and its associated back-up means radially inwardly to sealingly engage the pipe at selected positions and form a closed chamber which seals off the exterior of the connection between the pipe string of the additional segment of the pipe;

5. supplying pressurized test fluid into the closed chamber to externally test the connection;

6. measuring any decline of the pressure in the testing fluid occurring in the closed chamber, which decline is indicative of a leak in the connection;

7. depending upon whether there is or is not a decline in the pressure of the testing fluid in the closed chamber, performing one or the other of the following sets of steps:

(a) if there is no decline in the pressure of the testing fluid in the closed chamber, performing the steps comprising:

(1) releasing the pressure of the test fluid,
    (2) releasing the pressure of the actuating fluid,
    (3) moving upwardly the second gripping means to the vicinity of the upper end of the additional pipe segment,
    (4) gripping the additional pipe segment at the vicinity of its upper end with the second gripping means,
    (5) releasing the first gripping means, and
    (6) moving downwardly the second gripping means thereby forcing the string of pipe further into the pressurized well;

(b) if there is a decline in the pressure of the testing fluid indicating a leak in the connection performing the steps comprising:

(1) releasing the pressure of the test fluid,
    (2) releasing the pressure of the actuating fluid,
    (3) disconnecting the additional segment of pipe from the pipe string;
    (4) making a new connection between the pipe string and a segment of pipe, and
    (5) repeating steps 3 through 7; and 8. repetitively repeating steps 1 through 7 until a selected length of pipe string has been snubbed into the pressurized well with the connections between the various pipe segments thereof being tested immediately before being snubbed into the well.

3. The method of forcing a string of pipe into a well under pressure and testing the connections between the pipe segments comprising the string of pipe immediately before such connections in the string of pipe are forced into the pressurized well, including the steps of:

1. securing to the well first means for releasably gripping the string of pipe;

2. securing to the well for vertical movement relative thereto second means for releasably gripping selected upper segments of the string of pipe;

3. providing means to move the second gripping means downwardly to the well whereby the pipe gripped thereby will be forced into the pressurized well;

4. providing means for placing an additional segment of pipe in position above the upper end of the pipe string and connecting such additional segment of pipe into the pipe string;

5. securing vertically adjacent to the second gripping means, a testing apparatus comprising a body for encircling a selected length of the pipe string and having an opening extending longitudinally therethrough through which may be passed the connected pipe segments comprising the pipe string, said apparatus including:

first and second annular grooves therein spaced longitudinally along the opening;

annular seal means mounted in each groove for inwardly and outwardly radial movement, each of the annular seal means comprising an annular elastomer body having an inner surface extending generally towards the pipe string to be sealingly engaged and having an outer circumferential surface for receiving fluid pressure, the inner surface including two opposing sloping surfaces which taper inwardly to a surface which physically engages the pipe when the annular seal means is moved radially inwardly;

back-up means mounted in association with each annular seal means for inward and outward radial movement with such seal means, the back-up means for each annular seal means comprising a plurality of anti-extrusion elements mounted on the upper inner portion and the lower inner portion of the annular seal means so as to be simultaneously movable therewith in a radial direction and so as to form a substantially circular ring on the upper inner portion and the lower inner portion of the annual seal means when the annular seal means and the back-up means engage the pipe;

each of the plurality of anti-extrusion elements forming the back-up means having a first surface extending toward the tubular member to be sealingly engaged and having a sloping surface for engaging the sloping surface of the annular seal means which tapers inwardly toward the tubular member;

6. providing means for supplying a pressurized actuating fluid directly against the outer circumferential surface of the annular seal means to force the annular seal means and its associated back-up means radially inwardly whereby the annular seal means and the back-up means sealingly engage the pipe string at selected positions, the spaced annular seal means and the body thereby forming a closed chamber which seals off the exterior of a portion of the pipe string and a connection therein to be tested;

7. providing means for supplying a pressurized test fluid to the test apparatus for insertion into the closed chamber for externally testing the selected connection enclosed in the closed chamber;

8. providing means for measuring any decline of the pressure of the testing fluid occurring in the closed chamber;

9. gripping with the first gripping means the string of the pipe being forced into the pressurized well;

10. placing an additional segment of pipe in position above the upper end of the pipe string and connecting it to the uppermost segment of the pipe string;
11. moving vertically the second gripping means and the testing apparatus mounted vertically adjacent thereto to a point where the connection between the additional pipe segment and the pipe string is within the longitudinal opening of the testing apparatus;
12. supplying actuating fluid under pressure directly against the outer circumferential surface of each of the annular seal means to force the annular seal means and its associated back-up means radially inwardly to sealingly engage the pipe at selected positions and form a closed chamber which seals off the exterior of the connection between the pipe string and and additional segment of pipe;
13. supplying pressurized test fluid into the closed chamber to externally test the connection;
14. measuring any decline of the pressure in the testing fluid occurring in the closed chamber, which decline is indicative of a leak in the connection;
15. depending upon whether there is or is not a decline in the pressure of the testing fluid in the closed chamber, performing one or the other of the following sets of steps:
    (a) if there is no decline in the pressure of the testing fluid in the closed chamber, performing the steps comprising:
        (1) releasing the pressure of the pressurized test fluid,
        (2) releasing the pressure of the pressurized actuating fluid,
        (3) moving upwardly the second gripping means to the vicinity of the upper end of the additional pipe segment,
        (4) gripping the additional pipe segment at the vicinity of its upper end,
        (5) releasing the first gripping means, and
        (6) moving downwardly the second gripping means thereby forcing the string of pipe further into the pressurized well;
    (b) if there is a decline in the pressure of the testing fluid indicating a leak in the connection, performing the steps comprising:
        (1) releasing the pressurized test fluid,
        (2) releasing the pressurized actuating fluid,
        (3) moving the second gripping means and the testing apparatus mounted vertically adjacent downwardly to a selected point,
        (4) disconnecting the connection between the pipe string and the additional segment of the pipe which the test has shown is defective,
        (5) making up a new connection between the pipe string and a segment of pipe, and
        (6) repeating steps 11 through 15; and
16. repetitively repeating steps 9 through 15 until a selected length of pipe string has been forced into the pressurized well.

4. An apparatus for testing connections between pipe segments comprising a string of pipe being snubbed into a well under pressure immediately before such connections are forced into the pressurized well, comprising:
first gripping means attached to the well;
means for placing an additional segment of pipe in position above the uppermost segment of the pipe string;
means for connecting such additional segment of the pipe to the uppermost section of the pipe string;
second gripping means mounted above the first gripping means and mounted for vertical movement relative to the well;
a testing apparatus mounted above the second gripping means and mounted for movement therewith; and
means for providing vertical forces to the second gripping means to move the second gripping means and the testing apparatus mounted therewith a selected direction upwardly or downwardly.

5. An apparatus for forcing a string of pipe into a well under pressure and testing the connections between the pipe segments comprising the string of pipe immediately before such connections are forced into the pressurized well, comprising:
first gripping means attached to the well;
means for placing an additional segment of pipe in position above the uppermost segment of the pipe string;
means for connecting such additional segment of the pipe to the uppermost section of the pipe string;
second gripping means mounted above the first gripping means and mounted for vertical movement relative to the well;
a testing apparatus mounted above the second gripping means and mounted for movement therewith, said testing apparatus including:
a body for encircling a selected length of the pipe string and having an opening extending longitudinally therethrough through which may be passed the connected pipe segments comprising the pipe string,
first and second annular grooves spaced longitudinally along the opening,
annular seal means mounted in each groove for inwardly and outwardly radial movement, each of the annular seal means comprising an annular elastomer body having an inner surface extending generally towards the pipe string to be sealingly engaged and having an outer circumferential surface for receiving fluid pressure, the inner surface including two opposing sloping surfaces which taper inwardly to a surface which physically engages the pipe when the annular seal means is moved radially inwardly,
back-up means mounted in association with each annular seal means for inward and outward radial movement with such seal means, the back-up means for each annular seal means comprising a plurality of anti-extrusion elements mounted on the upper inner portion and the lower inner portion of the annular seal means so as to be simultaneously movable therewith in a radial direction and so as to form a substantially circular ring on the upper inner portion and the lower inner portion of the annular seal means when the annular seal means and the back-up means engage the pipe,
each of the plurality of anti-extrusion elements forming the back-up means having a first surface extending toward the tubular member to be sealingly engaged and having a sloping surface for engaging the sloping surface of the annular seal means which tapers inwardly toward the tubular members; and means for providing vertical forces to the second gripping means to move the second gripping means and the testing apparatus mounted therewith a selected direction upwardly or downwardly.

6. The method of testing the connections between the pipe segments comprising a string of pipe being snubbed into a well immediately before such connections are forced into the well, including the steps of:

1. gripping with first gripping means attached to the well the string of the pipe being forced into the well;
2. placing an additional segment of pipe in position above the uppermost segment of the pipe string and connecting such additional segment of pipe to the uppermost segment of the pipe string;
3. moving vertically second gripping means and a testing apparatus for externally testing the connection between the additional segment of pipe and the pipe string;
4. operating the testing apparatus to test externally the connection between the additional segment of pipe and the pipe string;
5. depending upon whether the external test evidences the connection does or does not leak, performing one or the other of the following sets of steps:
   (a) if there is no leak in the connection performing the steps comprising:
      (1) releasing the testing apparatus from the connection;
      (2) moving upwardly the second gripping means to the vicinity of the upper end of the additional pipe segment,
      (3) gripping the additional pipe segment in the vicinity of its upper end with the second gripping means,
      (4) releasing the first gripping means, and
      (5) moving downwardly the second gripping means thereby forcing the string of pipe further into the well;
   (b) if there is a leak in the connection, performing the steps comprising:
      (1) releasing the testing apparatus from the connection,
      (2) disconnecting the additional segment of pipe from the pipe string;
      (3) making up a new connection between the pipe string and a segment of pipe, and
      (4) repeating steps 3 and 5; and
6. repetitively repeating steps 1 through 5 until a selected length of pipe string has been snubbed into the well with the connections between the various pipe segments thereof being tested immediately before being snubbed into the well.

7. The method of forcing a string of pipe into a well and testing the connections between the pipe segments comprising the string of pipe immediately before such connections in the string of pipe are forced into the well, including the steps of:

1. securing to the well first means for releasably gripping the string of pipe;
2. securing to the well for vertical movement relative thereto second means for releasably gripping selected upper segments of the string of pipe;
3. providing means to move the second gripping means downwardly to the well whereby the pipe gripped thereby will be forced into the well;
4. providing means for placing an additional segment of pipe in position above the upper end of the pipe string and connecting such additional segment of pipe into the pipe string;
5. securing vertically adjacent to the second gripping means, a testing apparatus comprising a body for encircling a selected length of the pipe string and having an opening extending longitudinally therethrough through which may be passed the connected pipe segments comprising the pipe string, said apparatus including:
   first and second annular grooves therein spaced longitudinally along the opening;
   annular seal means mounted in each groove for inwardly and outwardly radial movement, each of the annular seal means comprising an annular elastomer body having an inner surface extending generally towards the pipe string to be sealingly engaged and having an outer circumferential surface for receiving fluid pressure, the inner surface including two opposing sloping surfaces which taper inwardly to a surface which physically engages the pipe when the annular seal means is moved radially inwardly;
   back-up means mounted in association with each annular seal means for inward and outward radial movement with such seal means, the back-up means for each annular seal means comprising a plurality of anti-extrusion elements mounted on the upper inner portion and the lower inner portion of the annular seal means so as to be simultaneously movable therewith in a radial direction and so as to form a substantially circular ring on the upper inner portion and the lower inner portion of the annual seal means when the annular seal means and the back-up means engage the pipe;
   each of the plurality of anti-extrusion elements forming the back-up means having a first surface extending toward the tubular member to be sealingly engaged and having a sloping surface for engaging the sloping surface of the annular seal means which tapers inwardly toward the tubular member;
6. providing means for supplying a pressurized actuating fluid directly against the outer circumferential surface of the annular seal means to force the annular seal means and its associated back-up means radially inwardly whereby the annular seal means and the back-up means sealingly engage the pipe string at selected positions, the spaced annular seal means and the body thereby forming a closed chamber which seals off the exterior of a portion of the pipe string and a connection therein to be tested;
7. providing means for supplying a pressurized test fluid to the test apparatus for insertion into the closed chamber for externally testing the selected connection enclosed in the closed chamber;
8. providing means for measuring any decline of the pressure of the testing fluid occurring in the closed chamber;
9. gripping with the first gripping means the string of the pipe being forced into the well;
10. placing an additional segment of pipe in position above the upper end of the pipe string and connecting it to the uppermost segment of the pipe string;

11. moving vertically the second gripping means and the testing apparatus mounted vertically adjacent thereto to a point where the connection between the additional pipe segment and the pipe string is within the longitudinal opening of the testing apparatus;
12. supplying actuating fluid under pressure directly against the outer circumferential surface of each of the annular seal means to force the annular seal means and its associated back-up means radially inwardly to sealingly engage the pipe at selected positions and form a closed chamber which seals off the exterior of the connection between the pipe string and an additional segment of pipe;
13. supplying pressurized test fluid into the closed chamber to externally test the connection;
14. measuring any decline of the pressure in the testing fluid occurring in the closed chamber, which decline is indicative of a leak in the connection;
15. depending upon whether there is or is not a decline in the pressure of the testing fluid in the closed chamber, performing one or the other of the following sets of steps:
    (a) if there is no decline in the pressure of the testing fluid in the closed chamber, performing the steps comprising:
       (1) releasing the pressure of the pressurized test fluid,
       (2) releasing the pressure of the pressurized actuating fluid,
       (3) moving upwardly the second gripping means to the vicinity of the upper end of the additional pipe segment,
       (4) gripping the additional pipe segment at the vicinity of its upper end,
       (5) releasing the first gripping means, and
       (6) moving downwardly the second gripping means thereby forcing the string of pipe further into the well;
    (b) if there is a decline in the pressure of the testing fluid indicating a leak in the connection, performing the steps comprising:
       (1) releasing the pressurized test fluid,
       (2) releasing the pressurized actuating fluid,
       (3) moving the second gripping means and the testing apparatus mounted vertically adjacent downwardly to a selected point,
       (4) disconnecting the connection between the pipe string and the additional segment of the pipe which the test has shown is defective,
       (5) making up a new connection between the pipe string and a segment of pipe, and
       (6) repeating steps 11 through 15; and
16. repetitively repeating steps 9 through 15 until a selected length of pipe string has been forced into the well.

8. An apparatus for testing connections between pipe segments comprising a string of pipe being snubbed into a well immediately before such connections are forced into the well, comprising:
   first gripping means attached to the well;
   means for placing an additional segment of pipe in position above the uppermost segment of the pipe string;
   means for connecting such additional segment of the pipe to the uppermost section of the pipe string;
   second gripping means mounted above the first gripping means and mounted for vertical movement relative to the well;
   a testing apparatus mounted above the second gripping means and mounted for movement therewith; and
   means for providing vertical forces to the second gripping means to move the second gripping means and the testing apparatus mounted therewith a selected direction upwardly or downwardly.

* * * * *